United States Patent [19]
Zdebski

[11] 3,791,336
[45] Feb. 12, 1974

[54] TRAFFIC SIGNALING DEVICE FOR VEHICLES

[76] Inventor: David M. Zdebski, 5416 S. Nordica Ave., Chicago, Ill. 60638

[22] Filed: July 26, 1973

[21] Appl. No.: 382,774

[52] U.S. Cl............. 116/28 R, 40/129 C, 116/41, 160/132, 350/97
[51] Int. Cl. .................................................... B60q
[58] Field of Search.......... 116/28 R, 41, 114, 63 R, 116/63 D, 173, 174, 175; 40/129 C; 240/1.3, 23, 24; 248/43; 350/97

[56] References Cited
UNITED STATES PATENTS

| | | | |
|---|---|---|---|
| 1,283,262 | 10/1918 | Moore | 116/41 |
| 1,771,554 | 7/1930 | Bollheimer | 160/132 |
| 2,193,747 | 3/1940 | Thompson | 116/175 |
| 2,288,442 | 6/1942 | Felton | 248/43 X |
| 2,645,977 | 7/1953 | Wilford | 350/97 |
| 3,738,039 | 6/1973 | Defuria | 40/129 C |

Primary Examiner—Louis J. Capozi
Attorney, Agent, or Firm—Marden S. Gordon

[57] ABSTRACT

The embodiment of the invention disclosed herein is directed to a traffic signaling device for vehicles which includes a bracket having a first end arranged for connection to the upper free exposed edge portion of a partially opened side window of the vehicle. The bracket has the second end thereof arranged for connection in a simple and easy manner to the distress signaling reflective warning device. A collapsible distress signaling reflective warning element is formed of a plurality of triangularly shaped segments, each segment including a given apex thereof in common registry with other segments so that the plurality of triangularly shaped segments can be secured together at the given apex by means of a locking bolt or rivet. A mounting bar is also secured to the locking bolt or rivet and provides means for connection to the bracket which, in turn, provides a relatively small, collapsible and somewhat compact and easily partially disassemblable structure which can be stored when not in use in small places such as glove compartments, or the like, and which can be opened and placed in a signalling location on the window from inside the vehicle without the driver having to exit from the vehicle.

16 Claims, 10 Drawing Figures

PATENTED FEB 12 1974 3,791,336

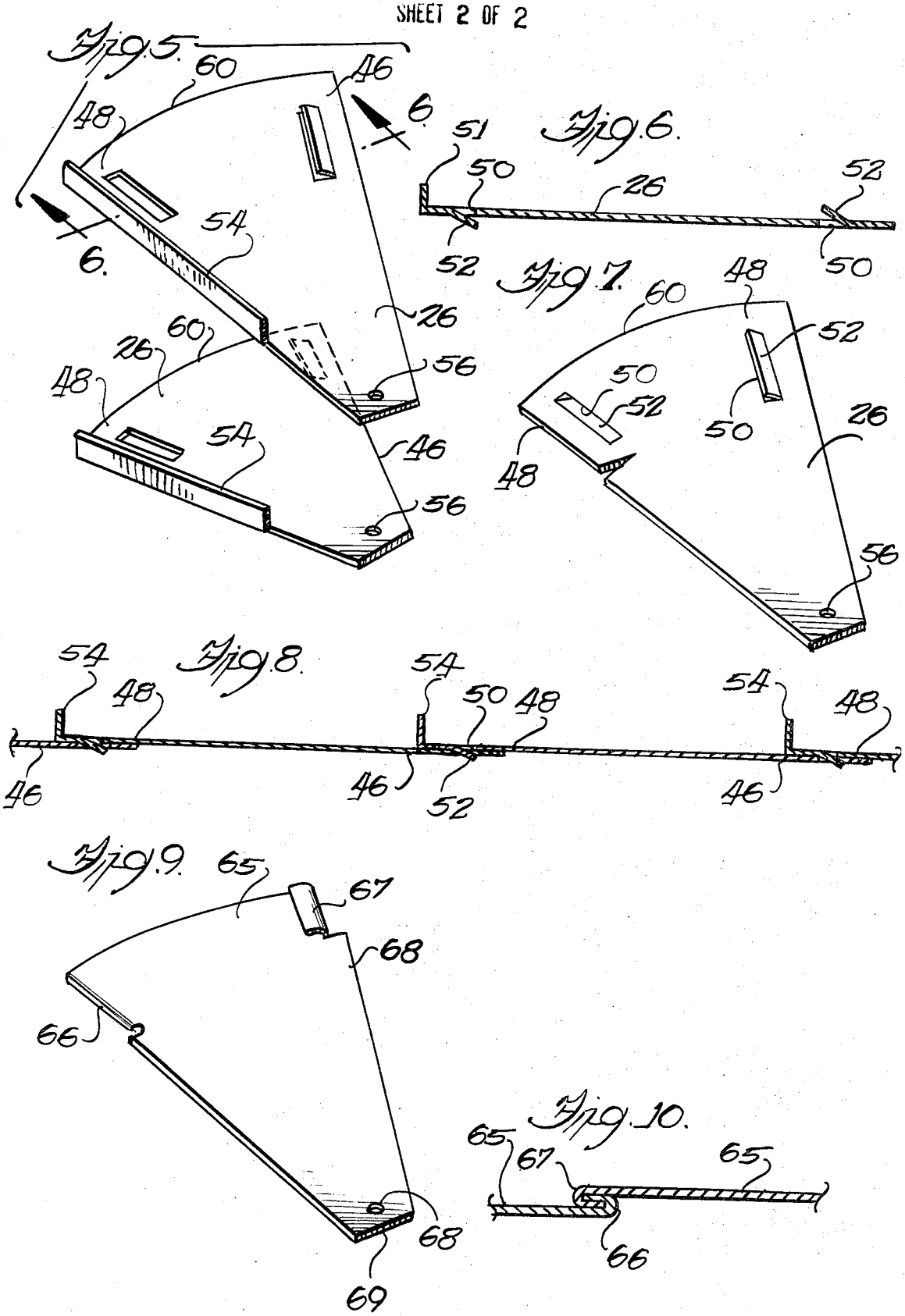

TRAFFIC SIGNALING DEVICE FOR VEHICLES

BACKGROUND OF THE INVENTION

1. Field of the Invention

This invention relates generally to improvements in structures and apparatus used primarily in the field of vehicle warning devices, and more particularly to a distress signaling reflecting warning device and its structure and combination of elements that provides substantial useful improvements over existing similar devices which are commonly used in trucks, automobiles, and the like. However, it will be understood that while this invention is directed particularly to devices used in the field of distress signaling for automobile type vehicles, it will be understood that the device disclosed herein can be used in other allied fields such as truck signaling, boat signaling, and the like.

2. Description of the Prior Art

Heretofore, distress signaling devices for use in vehicles have been relatively complex to use and expensive to manufacture thereby making their general acceptance among the driving public somewhat less than desirable. Emergency signs for vehicles and the like have heretofore taken many forms but generally they have included some type of sign designed to be attached to the automobile and to convey a message indicating the nature of the distress. There has been little effort to use such signs not only as a means of getting help from other automobiles but also to warn other automobiles of a particular danger that may be encountered as a result of the parked vehicle having the sign posted thereon. The most commonly used method of providing this type of warning has been the use of flares. Flares require that the user thereof place the flares sufficiently away from the automobile so as to be in a safe position while the person is moving about the exterior of the automobile to replace tires, or replenish gasoline, and the like. Flares of this type placed too close to automobiles when refueling the automobile may cause a danger not only to the automobile being refueled but also to oncoming traffic, as a result of an unexpected explosion.

Travel on the interstate highway systems throughout various countries, such as the United States and Germany, require that automobiles travel at a relatively high rate of speed, and it is often necessary that the driver of the vehicle on this type of highway system be on the alert for unexpected occurences on the roadway ahead. One type of unexpected occurence is the disabled vehicle along the side of the highway, or in some cases in the middle of the high speed lane of the roadway. It is not always possible for the driver of the oncoming vehicle to clearly discern whether the vehicle on the shoulder or on the highway is moving or standing still until he realizes that he is approaching the vehicle at a relatively fast closing rate. Thus the driver of the oncoming vehicle will make a last minute effort to move to one side or the other of the highway to prevent colliding with the standing vehicle. Furthermore, during heavy traffic conditions it is not always convenient for the driver of the oncoming vehicle to move to one lane or the other without in fact creating a dangerous condition to himself and to other vehicles. Therefore it is desirable to have warning signs or markings on the stationary vehicle to indicate to conoming traffic that a distress condition exists so that the oncoming traffic can commence taking corrective action as soon as possible to prevent injury and damage to personnel and automobiles, respectively.

As is well known, it frequently happens that, as a result of accidents, mechanical failure, or depletion of the fuel supply, a vehicle is forced to stop on the side of the roadway or in the middle of the roadway before it is pushed to the side. It is also well known that it is difficult to signal or attract the attention of oncoming traffic that a distress condition exists because the oncoming traffic is approaching at a relatively high rate of speed.

SUMMARY OF THE INVENTION

Accordingly, it is a feature of this invention to provide a distress signaling reflective warning device to be mounted to the exterior of a vehicle to indicate to other oncoming traffic that a distress condition exists in sufficient time to allow the oncoming traffic to take corrective measure in their maneuvering of the automobile to prevent further damage to property and injury to life.

Another feature of this invention is the provision of a new and useful distress signaling reflective warning device to be mounted to the exterior of an automobile to indicate to other oncoming traffic that a distress condition exists, wherein a bracket is fashioned to have a first end thereof arranged for quick connection to the signaling device and the second end thereof arranged for attachment to the upper free edge of an open side window of the vehicle without the driver having to exit from the vehicle.

Another feature of this invention is the provision of a new and useful distress signaling reflective warning device to be mounted to the exterior of an automobile to indicate to other oncoming traffic that a distress condition exists, wherein a collapsible distress signaling reflective warning element is formed of a plurality of triangularly shaped segments each of which have an apex thereof in common registry with the other and through which is provided a locking or pivoting securing device such as a bolt or rivet so that the plurality of triangularly shaped segments can be fanned open and closed during use and storage, respectively.

Another feature of this invention is the provision of a new and useful distress signaling reflective warning device to be mounted to the exterior of an automobile to indicate to other oncoming traffic that a distress condition exists, wherein a mounting member secured to the pivot means which passes through the apex of said plurality of triangularly shaped segments and which cooperates with the first quick connect end of said bracket so as to facilitate fastening said bracket thereto during a use condition and to facilitate removal of the bracket during a storage condition.

Another feature of this invention is the provision of a new and useful distress signaling reflective warning device to be mounted to the exterior of an automobile to indicate to other oncoming traffic that a distress condition exists, wherein a slot is formed in only a single one of said plurality of arcuately shaped segments to allow this particular segment to have an overriding locking interconnection with an adjacent segment so that the free edge and the locking edges of these two segments can be interconnected one with the other to provide a tight locking action therebetween to hold the plurality of triangularly shaped segments in an opened condition while in use.

Another feature of this invention is the provision of a new and useful distress signaling reflective warning device to be mounted to the exterior of an automobile to indicate to other oncoming traffic that a distress condition exists wherein the free edge of each segment and the locking edge of each segment have a diverging outward configuration.

Another feature of this invention is to provide a new and useful distress signaling reflective warning device to be mounted to the exterior of an automobile to indicate to other oncoming traffic that a distress condition exists, wherein the free edge includes a slot formed therein and the locking edge includes a depending portion which engages the slot of an adjacently positioned free edge to interconnect therewith so that each of said plurality of arcuately shaped segments interlock one with the other when they are in an open condition during use.

Another feature of this invention is the provision of a new and useful distress signaling reflective warning device to be mounted to the exterior of an automobile to indicate to other oncoming traffic that a distress condition exists, wherein the free edge portion of each of said plurality of triangularly shaped segments is provided with a first turned over portion bent upon itself in one direction and wherein said locking edge of each of said plurality of triangularly shaped segments has a second turned over portion bent upon itself in a direction opposite that of said first turned portion, and wherein each of said first and second turned over portions interconnect one with the other of correspondingly adjacent positioned triangularly shaped segments to interlock and form a distress signaling reflecting device substantially completely in a circular and conical configuration.

Another feature of this invention is the provision of a new and useful distress signaling warning device to be mounted to the exterior of an automobile to indicate to other oncoming traffic that a distress condition exists, wherein the bracket utilized to mount the warning device has a U-shaped slot formed in the extremity thereof and an immediately adjacent positioned keyhole shaped slot, said U-shaped slot adapted to be positioned over a threaded stud to receive a locking threaded device thereon and said keyhole shaped slot adapted to be positioned over a head portion of a rivet like member and slid downwardly thereupon to facilitate securing said bracket to said warning device.

Another feature of this invention is the provision of a new and useful distress signaling reflective warning device to be mounted to the exterior of an automobile to indicate to other oncoming traffic that a distress condition exists wherein, the effective arcuate length of each of said plurality of triangularly shaped segments is slightly less at the periphery thereof to allow said segments to be pulled tightly together to form a conical configuration substantially concave in configuration in the direction of oncoming traffic.

Another feature of this invention is the provision of a new and useful distress signaling reflective warning device to be mounted to the exterior of an automobile to indicate to other oncoming traffic that a distress condition exists, wherein the bracket utilized to mount the distress signaling device to the automobile is formed of a length of flat stripstock having a twisted portion intermediate its ends thereof so that the mounting end of the bracket is disposed at 90° from the quick connecting end which is fastened to the reflecting device.

Another feature of this invention is the provision of a new and useful distress signaling reflective warning device to be mounted to the exterior of an automobile to indicate to other oncoming traffic that a distress condition exists, wherein said second mounting end of said bracket is provided with a U-shaped hook member to fit over the upper exposed free edge of a side window of an automobile and further includes a suction cup element disposed immediately beneath said U-shaped hook member firmly to engage the glass surface to hold the device in position without the driver having to exit from the vehicle to expose himself to oncoming traffic.

Still another feature of this invention is the provision of a new and useful distress signaling reflective warning device to be mounted to the exterior of an automobile to indicate to other oncoming traffic that a distress condition exists, wherein the outer peripheral edge portions of each of said plurality of arcuately shaped segments is arcuate in configuration thereby providing a circular configuration of said distress signaling reflective warning device.

Yet still another feature of this invention is the provision of a new and useful distress signaling reflective warning device to be mounted to the exterior of an automobile to indicate to other oncoming traffic that a distress condition exists, wherein a plurality of reflective segmented areas are provided about the general configuration of the warning device to allow head light reflections to cast warning signals outwardly therefrom during night driving conditions.

Many other features and advantages of this invention will be more fully realized and understood from the following detailed description when taken in conjuction with the accompanying drawings wherein like reference numerals throughout the various views of the drawings are intended to designate similar elements or components.

BRIEF DESCRIPTION OF THE DRAWINGS

FIG. 5 is an exploded fragmentary view illustrating two of the plurality of triangularly shaped segments positioned in a somewhat collapsed condition so as to facilitate storage of the device of this invention;

FIG. 6 is a sectional view taken along line 6—6 of FIG. 6 illustrating the bent and struck down and up portions forming slot and tab members at the free and locking edges, respectively, of the triangularly shaped segments in one embodiment thereof;

FIG. 7 is a perspective view illustrating a specific one of the plurality of triangularly shaped segments, which specific one is provided with an elongated slot to facilitate overlapping of the segments during a locking together action;

FIG. 8 is a side sectional view of several of the plurality of triangularly shaped segments, as taken somewhat through the area of the locking end tab portions to facilitate opening of the warning device;

FIG. 9 is a perspective view illustrating an alternate embodiment of this invention wherein the free edge and locking edge are provided with turned over portions bent upon themselves in opposite directions, which turned over portions are interconnected with one another with respect to adjacently positioned triangularly shaped segments to facilitate interlocking thereof; and FIG. 10 is a sectional view illustrating the interlocking of two adjacent triangularly shaped sections which have the turned over bent portions engaging one another in accordance with the alternate embodiment of this invention.

DESCRIPTION OF THE PREFERRED EMBODIMENTS

Figure 1:
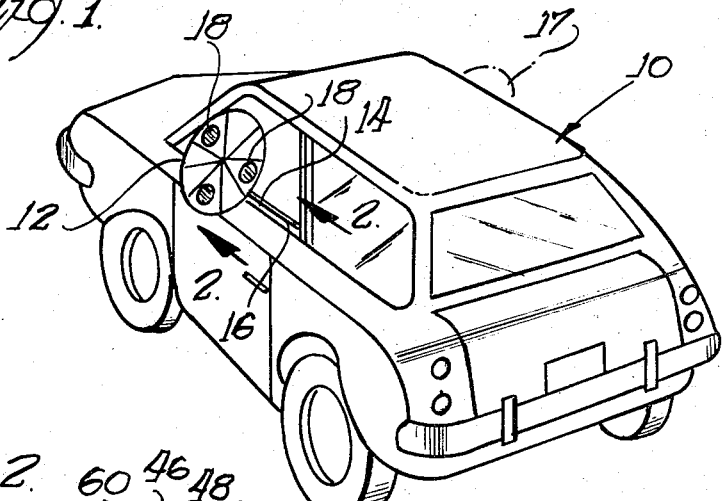
FIG. 1 is a perspective rear quarter view of an automobile utilizing the distress signaling reflective warning device of this invention.

Referring now to FIG. 1 there is seen an automobile which is designated generally by reference numeral 10, and which has mounted thereto a distress signaling reflective warning device constructed in accordance with the principles of this invention. Here the distress signaling warning device is designated generally by reference numeral 12 and is fashioned to engage the upper free edge portion 14 of a partially lowered side window 16 of the automobile 10. As indicated in broken line 17, the reflective warning device of this invention can be mounted to either side of the automobile merely by changing the direction of the mounting bracket secured thereto, such mounting being accomplished by the driver without having to exist from the car. Therefore, during a condition of emergency the operator of the automobile 10 merely removes the distress signaling reflective warning device from its storage place, as for example from the glove compartment or the like, and opens the device, secures the mounting bracket, and then fastens the mounting bracket and the device to the lowered free edge portion 14 of the side window 16. To facilitate a warning condition during night time use the distress signaling reflective device 12 includes a plurality of strategically located reflective elements 18, preferably positioned 120° apart from one another so as to provide evenly spaced areas of reflective material. It will be understood that more or less of the reflective areas may be used as desired.

Figure 2:
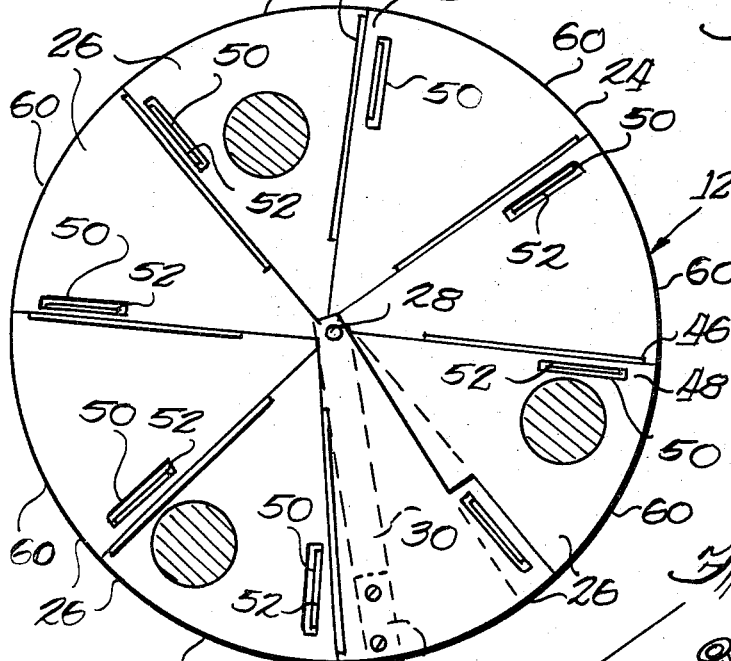
FIG. 2 is a view of the distress signaling reflective warning device of this invention showing the general configuration thereof and further illustrating the mounting of the device to the top free edge of a side open window of the automobile of FIG. 1.
Figure 3:
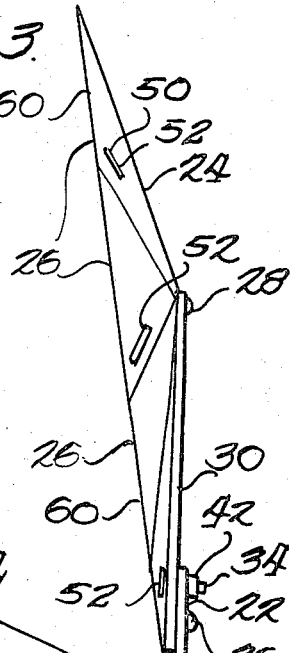
FIG. 3 is a side view of the distress signaling device of FIG. 2 further illustrating its configuration of mounting to the upper free edge of the open window of the automobile.
Figure 4:
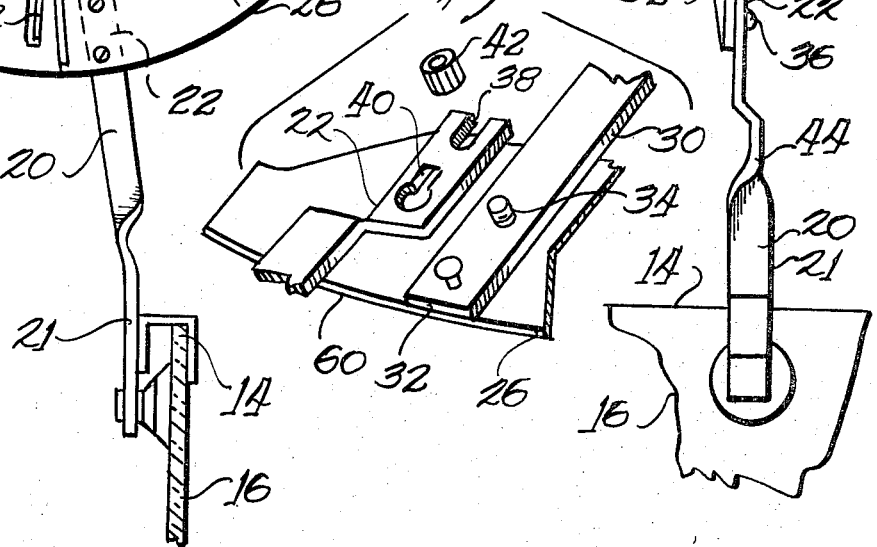
FIG. 4 is an exploded fragmentary perspective view illustrating the general means by which the mounting bracket is secured to the distress signaling device during assembly and disassembly thereof for use and storage, respectively.

As best seen in FIGS. 2 and 3 the distress signaling reflective warning device 12 includes a bracket 20 having a first end 21 arranged for connection to the upper free edge portion 14 of the partially opened window 16, and a second end portion 22 provided with quick connect means to facilitate fastening and unfastening of the bracket to the reflective warning device 12.

The reflective warning device 12 comprises a collapsible distress signaling reflective element 24 formed of a plurality of triangularly shaped segments 26. Each of the plurality of triangularly shaped segments 26 is provided with an aperture located at the apex thereof and through which a locking rivet or bolt 28 passes, as best seen in FIG. 2, securely to hold the plurality of triangularly shaped segments together so they can be operated in a fan-like action for opening and closing. The pivot member 28 passes through each of the apertures formed in the segments and thereby also provides means for holding the plurality of segments together. Also secured to the fastening rivet or bolt 28 is a mounting member 30 which has the extended portion 32 thereof provided with a threaded shaft 34 and a rivet head member 36. The threaded shaft 35 engages a U-shaped slot 38 of the quick connect end 22 while the rivet head 36 passes through a keyhole shaped slot 40, and wherein relatively sliding movement between the slots 38 and 40 with regard to their threaded elements 34 and rivet elements 36, respectively, provided means for fastening and locking the bracket 20 to the mounting member 30 in a quick and easy manner. The threaded member 34 is provided with a thumb screw or sing nut 42 to allow manual fastening of these elements.

The bracket 20 is provided with a twist portion 44 located intermediate the ends 21 and 22 thereof so that the orientation of the ends is 90° relative to one another. Therefore fastening of the device of this invention to side window of an automobile will facilitate substantially perpendicular display of the device extending radially outwardly of the automobile as illustrated in FIG. 1.

Each of the plurality of triangularly shaped segments 26 is provided with a free edge 46 and a locking edge 48, they being selected arbitrarily, and which are provided with slots 50 and tab members 52 engaging the slots to lock the triangularly shaped segments together. While the slots are formed by bent struck portions which, in turn, form the tabs, they are here considered as separate elements with regard to the structure disclosed. That is, slots can be formed in one edge and tabs welded or otherwise secured to the other edge to cooperate therewith.

As best seen in FIG. 6 the slots 50 are formed from the angularly bent portions 52 which are also used to form the tabs of each of the plurality of triangularly shaped segments 26. Furthermore, each of the triangularly shaped segments, except for one, is provided with an upturned edge portion 54, as best seen in FIGS. 5 and 6, to interact one with another so that during closing or collapsing of the triangularly shaped segments, the device can be folded in a fan-like fashion for storage. Also, as more clearly seen in FIGS. 5 and 7, the aperture formed at the apex of each of the triangularly shaped sections is here designated generally be reference numeral 56 and receives a rivet or mounting bolt 28 for securing the segments together.

FIG. 8 illustrates a plurality of triangularly shaped segments fastened together when the structure is in an opened condition. Here it can be seen that the slots 50 cooperate with the tabs 52 to interlock one with the other to form a structure similar to that shown in FIGS. 2 and 3. Furthermore, by providing a peripheral extent of the plurality of triangularly shaped segments which is somewhat less than the effective or intended arcuate extent, the plurality of triangularly shaped segments can be locked together securely to form a shallow cone shaped structure, as best seen in the side view of FIG. 3. This provides a structure which picks up light for reflection more readily.

In the preferred embodiment, each of the triangularly shaped segments 26 has an arcuate peripheral configuration at the radially outwardly most extent portion thereof, this is designated generally by reference numeral 60. This arcuate configuration, when combined with the arcuate configuration of each of the segments conforms to a configuration substantially circular, as best seen in FIG. 2. However, it will be understood that other peripheral configurations can be utilized without departing from this invention. For example, the peripheral configuration may be straight so that each of the segments has a straight line or cord formed from edge to edge.

Referring now to FIGS. 9 and 10 there are seen the details of construction of an alternate embodiment of this invention. The general configuration and cooperation of the various components of the alternate embodiment is substantially the same as that of the preceding Figures. Therefore only the specific details of construction of a single one of the triangularly shaped segments is here illustrated.

In this embodiment a plurality of triangularly shaped segments 65 are provided with turned over bent portions 66 and 67 formed at the free and locking end portions, respectively. A flange 68 is also provided at one edge to facilitate closing of the triangularly shaped portions during storage. Also an aperture 68 is formed at the apex 69 so that a suitable locking bolt or rivet can secure the plurality of triangularly shaped segments together as described with regard to the embodiment disclosed in FIGS. 2 and 3. As best seen in FIG. 10, a cross-sectional fragmentary view illustrates the interlocking of the turned over bent portions 66 and 67 which allow the triangularly shaped segments to be secured to one another.

While several preferred embodiments of the invention have been illustrated herein with great particularity, it will be understood that a multitude of variations and modifications, as for example, to size, dimensions, shape and number of triangularly shaped components, may be effected without departing from the spirit and scope of the novel concepts disclosed and claimed herein.

Having thus described the invention, what is claimed is:

1. A distress signaling reflecting warning device to be mounted to the exterior of an automobile to indicate to other oncoming traffic that a distress condition exists, said distress signaling reflecting warning device comprising in combination:

a bracket having a first end arranged for connection to the upper free exposed edge portion of a partially opened side window of the automobile, said bracket having a second end thereof provided with quick fastening means, a collapsable distress signaling reflecting warning element formed of a plurality of triangularly shaped segments, each having an aperture thereof formed in a given apex and in common registry with each of the other plurality of triangularly shaped segments and including a free edge and a locking edge, pivot means passing through said given apex of said plurality of said triangularly shaped segments, thereby allowing said plurality of triangularly shaped segments to be collapsed upon themselves when said distress signaling reflecting warning device is not in use, a mounting member secured to said pivot means and extending toward the periphery of said collapsable distress signaling reflecting warning element, said mounting member including means to receive said quick fastening means located at said second end of said bracket, and a slot formed in at least one of said plurality of triangularly shaped elements to allow this triangularly shaped element to have said free edge thereof override said locking edge of a last one of said plurality of triangularly shaped elements to facilitate locking together of said collapsable distress signaling reflective warning element to form an open fan-like configuration, whereby said plurality of triangularly shaped segments are openable to form the distress signaling warning device, and which can be collapsed to occupy a small space for storage when not in use.

2. In the distress signaling reflecting warning device to be mounted to the exterior of an automobile to indicate to other oncoming traffic that a distress condition exists, as set forth in claim 1 wherein, said free edge and said locking edge are diverging outwardly from said given apex at an angle of about $45°$, thereby requiring eight such triangularly shaped segments to form the entire distress signaling reflecting warning device.

3. In the distress signaling reflective warning device to be mounted to the exterior of an automobile to indicate to other oncoming traffic that a distress conditon exists, as set forth in claim 2 wherein, said free edge includes a slot formed therein and said locking edge has a depending struck down portion to engage said slot of an adjacent triangularly shaped segment to limit the arcuate extent of travel of each of the arcuately shaped segments during opening of said plurality of arcuately shaped segments.

4. In the distress signaling reflective warning device to be mounted to the exterior of an automobile to indicate to other oncoming traffic that a distress condition exists, as set forth in claim 2 wherein, said free edge includes a first turned over portion bent upon itself in one direction to form a U-shaped elongated section, and said locking edge has a second turned over portion bent upon itself to form a second U-shaped elongated portion in the direction opposite that of said first turned over portion, whereby said first and second turned over portions interlock one with the other of corresponding adjacent plurality of triangularly shaped segments to form arcuate movement limiting means for said plurality of triangularly shaped segments during opening of said distress signaling reflective warning device.

5. In the distress signaling reflective warning device to be mounted to the exterior of an automobile to indicate to the other oncoming traffic that a distress condition exists, as set forth in claim 2 wherein, said free edges or said locking edges are provided with a longitudinally disposed outwardly directed flange member to facilitate folding of said plurality of triangularly shaped signal segments.

6. In the distress signaling reflective warning device to be mounted to the exterior of an automobile to indicate to other oncoming traffic that a distress condition exists, as set forth in claim 5 wherein, said free edges include slots formed therein by striking out U-shaped elongated sections and bending said sections outwardly of the plane of said plurality of triangularly shaped segments, and wherein said locking edges include correspondingly shaped slots struck out in the opposite direction thereof to form locking tabs, said locking tabs meeting with the slots formed in adjacently disposed plurality of arcuately shaped segments to limit the arcuate movement thereof during opening of said distress signaling reflective warning device.

7. In the distress signaling reflective warning device to be mounted to the exterior of an automobile to indicate to other oncoming traffic that a distress condition exists, as set forth in claim 1 wherein, said bracket means has said second end thereof provided with a U-shaped slot formed in the endmost portion and a keyhole shaped slot having an enlarged circular portion contiguous with an elongated portion, said elongated portion corresponding to the U-shaped slot in both dimension and longitudinal axis, and wherein said mounting member secured to said pivotal means includes a threaded shank extending therefrom to engage said U-shaped slot and a rivet head member to engage said keyhole shaped opening to allow quick connection and disconnection of said bracket from said mounting member merely by disconnecting said threaded member from said threaded shaft and sliding said bracket relative to said mounting member.

8. In the distress signaling reflective warning device to be mounted to the exterior of an automobile to indicate to other oncoming traffic that a distress condition exists, as set forth in claim 1 wherein, the effective arcuate length of each of said plurality of arcuately shaped segments is slightly less at the outer periphery thereof than it is near the inner portion to allow the segments to be pulled tightly together to form a shallow conical member to facilitate reflective characteristics of a coating formed on the concave portion thereof.

9. In the distress signaling reflective warning device to be mounted to the exterior of an automobile to indicate to other oncoming traffic that a distress condition exists, as set forth in claim 3 wherein, said shallow conical configuration of said plurality of triangularly shaped segments is arranged to provide a diverging concave configuration in the direction which is to be visible to said oncoming traffic.

10. In the distress signaling reflective warning device to be mounted to the exterior of an automobile to indicate to other oncoming traffic that a distress condition exists, as set forth in claim 1 wherein, said bracket is formed of a length of flat strip stock, and wherein said first end and said second end are disposed relative to one another at 90° by forming a twist intermediate said first and second ends.

11. In the distress signaling reflective warning device to be mounted to the exterior of an automobile to indicate to other oncoming traffic that a distress condition exists, as set forth in claim 10 wherein, said first end is provided with a U-shaped member secured to said bracket to hook over the top free edge of an open window of the automobile and further including a suction cup device disposed therebeneath firmly to engage the glass surface area of the window to hold the distress signaling reflective warning device in position.

12. In the distress signaling reflective warning device to be mounted to the exterior of an automobile to indicate to other oncoming traffic that a distress condition exists, as set forth in claim 1 wherein, said plurality of triangularly shaped segments are formed of stamped out sheet metal components and wherein said free edge and said locking edge are formed substantially simultaneously with the stamping of the configuration of said triangularly shaped segments to form oppositely directed bent outwardly portions which interlock one with the other of correspondingly adjacent segments for locking the segments together when circularly fanned out.

13. In the distress signaling reflective warning device to be mounted to the exterior of an automobile to indicate to other oncoming traffic that a distress condition exists, as set forth in claim 1 wherein, said plurality of triangularly shaped segments are formed of sheet metal stampings, and wherein said free edge and said locking edge are provided with turned over bent portions in opposite directions so as to facilitate locking one with the other with the correspondingly adjacent ones of said plurality of triangularly shaped segments.

14. In the distress signaling reflective warning device to be mounted to the exterior of an automobile to indicate to other oncoming traffic that the distress condition exists, as set forth in claim 1 wherein, said plurality of triangularly shaped segments have the radially outwardly formed edge portion thereof arcuately shaped so that said plurality of triangular shaped segments, when joined together, form a circular configuration of said distress signaling reflective warning device.

15. In the distress signaling reflective warning device to be mounted to the exterior of an automobile to indicate to other oncoming traffic that a distress condition exists, as set forth in claim 14 wherein, selected ones of said plurality of triangularly shaped segments are provided with reflective elements substantially 120° apart from one another to facilitate visual awareness of said distress signaling reflective warning device during night time conditions when said device is perceived primarily as a result of headlight beam reflections from oncoming traffic.

16. In the distress signaling reflective warning device to be mounted to the exterior of an automobile to indicate to other oncoming traffic that a distress condition exists, as set forth in claim 1 wherein, said plurality of triangularly shaped segments have the free edge thereof, which is radially outwardly of said given apex, formed in an arcuate configuration, thereby providing a circular configuration when fanned open and locked together to form a circular distress signaling device, and wherein said free edge and said locking edge are provided with turned over portions bent upon themselves in opposite directions to facilitate interlocking thereof.

* * * * *